US008407576B1

(12) United States Patent
Yin et al.

(10) Patent No.: US 8,407,576 B1
(45) Date of Patent: Mar. 26, 2013

(54) SITUATIONAL WEB-BASED DASHBOARD

(75) Inventors: Zhongbin Yin, Vienna, VA (US);
Kezhong Hu, Vienna, VA (US)

(73) Assignee: Sitscape, Inc., Vienna, VA (US)

( * ) Notice: Subject to any disclaimer, the term of this patent is extended or adjusted under 35 U.S.C. 154(b) by 568 days.

(21) Appl. No.: 12/552,553

(22) Filed: Sep. 2, 2009

Related U.S. Application Data

(60) Provisional application No. 61/190,611, filed on Sep. 2, 2008, provisional application No. 61/190,612, filed on Sep. 2, 2008.

(51) Int. Cl.
*G06F 3/048* (2006.01)
(52) U.S. Cl. ........................................ 715/206; 715/837
(58) Field of Classification Search .................. 715/206, 715/837
See application file for complete search history.

(56) References Cited

U.S. PATENT DOCUMENTS

2006/0259586 A1* 11/2006 Wood et al. .................... 709/219
2006/0277481 A1* 12/2006 Forstall et al. ................. 715/764
2007/0266342 A1* 11/2007 Chang et al. .................. 715/810
2008/0307308 A1* 12/2008 Sullivan et al. ............... 715/723

* cited by examiner

*Primary Examiner* — Andrea Leggett
(74) *Attorney, Agent, or Firm* — Blank Rome LLP

(57) ABSTRACT

A method of assembling situational Web-based dashboard from a wide array of web pages, digital media and components with just a few clicks and no programming, so a user can view scattered information from disparate sources on a single web-based screen. The components that can be included into dashboard pages are: live-area components created on-demand from any sub-region of any web page or web application; any rich media component such as rich text, video, picture, widget; and any office document (Microsoft Office documents and PDF etc.). Each dashboard page can contain any number of components. The size, position, location and layout of the components in the dashboard can be easily configured using a computer mouse, or through a touch screen interface. Each component in the dashboard can do auto-refresh from the source with a specified time interval, which also prevents user session timeout for secured web sites. The resulting dashboard can also be shared with others for collaboration. A set of dashboard pages can also be bundle together, and automatically display in a slideshow mode on-screen to auto display and monitor large number of information.

17 Claims, 16 Drawing Sheets

[740]

| Rich Text | Upload Photo | Upload Doc | Video | Widget | Compoentize Web | Add From Components Library |

[741] Title: _____

[742] File: C:\documents\presentation.pdf  (Select File)

Tags: _____

[743] Page Name: _____

Visibility: ● private  ○ Friends Visibale  ○ Public

[744] Assign to Group: ☐ Work Group 1  ☐ Work Group 2

(Upload File Now)  (Cancel)  (Reset)

SITUATIONAL WEB-BASED DASHBOARD

RELATED APPLICATIONS

The present application claims priority to Provisional Application Ser. No. 61/190,611, filed Sep. 2, 2008, for "Component-level Visual Bookmarking for the Web," and Provisional Application Ser. No. 61/190,612, filed Sep. 2, 2009, for "Situational Web Portal," the contents of which are incorporated herein by reference.

FIELD OF THE INVENTION

The present invention relates to a method of componentizing any Web page, rich media or documents with just a few mouse-clicks and zero programming; then aggregating them in a situational Web-based dashboard user interface for at-a-glance view of multiple information from disparate web sites or sources; visually manipulating the components on the dashboard; auto-refreshing each component; and slide showing of a set of dashboard pages, all for more effective information viewing, presentation, monitoring, interaction and collaboration.

BACKGROUND OF THE INVENTION

There are numerous Web pages on the Internet and Intranet today, each with a URL (Uniform Resource Locator). Web users use a Web browser to access Web pages by entering a URL directly or through bookmarking or search engine. Typically, a browser window can make only one Web page visible on the screen at any single moment. If users want to access multiple Web pages within a Web browser, they need to open each web page one-by-one, and can view one page one at a time. For example, if a user wants to check its Yahoo! Mail Inbox, Facebook Status, Personal Bank Account balance, and a collaboration SharePoint team-space website in the Intranet, he/she needs to open each web site to do that, which is very inconvenient. Furthermore, in many cases, a user typically would be more interested in a region of a Web page such as a stock portfolio table, or a report chat, instead of the whole web page. Web browsers do not have such capabilities.

One common way to address those issues is to aggregate users' favorite information into centralized portal pages so that the user can access the new portal web pages, which contain multiple components (or called portlets or widgets) that the user would like to view on a regular basis. The main drawback of the portal or personal-start-pages approaches used by My Yahoo, iGoogle, is that they rely on existing widgets provided by vendors, such as Yahoo or Google. Those widgets are pre-built mini-applications that users can choose from a widget library and add to his web pages. While there is a wide selection of widgets available for common consumer-oriented usages such as Email, Weather, Stock indices, games, RSS-feed based News, the selection is very limited and almost non-exist to access business web applications.

There are countless Web pages available in the Internet and Intranet, most of which do not contain any pre-built component to access and display their information in a new web page. In addition, each user and each business's interests are different, and what they want to access and aggregate are also different. Consequently, it is not practical to pre-create all the widget components for all the users for all the cases.

The World Wide Web and all the Web-based applications are comprised of web pages; each has a unique URL (Uniform Resource Locator) to identify its address. To be able to easily revisit the same page again, a user typically saves the URL of the page he is reading, this is called web page bookmarking. Web browsers such as Internet Explorer and Firefox all have basic built-in bookmarking features for personal usage on desktop. There are also online web-based social bookmarking services such as del.icio.us of Yahoo! that enable users to save and share their bookmarks through a web site. Those social bookmarking services typically support tagging of the URL of web pages to assist organization, search and sharing a large number of bookmarks.

The current bookmarking functionalities provided by browsers or the social bookmarking services are all based on saving URLs of web pages. While it is easy and simple to use, it has some major drawbacks as well.

First, it is only a link and does not communicate what's behind it, requiring the user to make many extra clicks to open each page in a new browser window to know what's in the website. Since each bookmark typically contains only a title and a link, a user can only guess the content of the web page from the title. To actually get some real idea about the page, a user needs to click and open the web page first using the link in the bookmark. There is an extra step for each link. When the number of bookmark items is small, this might not be an issue. But when there is large number of bookmark entries a user needs to explore, those extra clicks and associated efforts can add up quickly. Open each link one-by-one can be a lot of extra work, and in many cases becomes prohibitive for people even to open those pages.

Second, traditional bookmarking typically can only point to the URL of a web page (at page-level), but cannot point to a specified area/region (rectangular sub-region) of web page of interest (sub-region or component-level). Most web pages contain various regions such as header, footer, sidebar, ads, plus the main content such as news article, reports, video, graph, table etc. In many cases, a user only cares about a subset (a sub-region/area) of the web page such as the weather condition of a city, instead of all the other regions of the web page. Bookmarking the whole page only loses this context or knowledge of what a user was focusing on.

Third, many web pages contain Web-forms, requiring user to enter or select a lot parameters in multiple fields, and then submit to the Web Server, to generating a resulting page such a page containing a graphical report. A significant number of such web pages use HTTP POST to make the Web request, which means the parameters are not visible in the Web URL of resulting page, thus makes it impossible to bookmark it directly. This forces the user to re-enter the same parameters again and again for the same functionalities, and it is very inconvenient.

Many rich media content, such as rich text, pictures, video and embeddable widgets, are web-page friendly, and thus can be embedded directly in HTML-based web pages, and viewable or playable right in the web page. Yet, this is not the case for other types of content, such as Microsoft Office documents (Word, Excel, PowerPoint etc.). While links can be included to those documents in web pages, users need to click a link to a document first, and then open in an external desktop application such a Microsoft Office to view the content of the document. While the situation is a little better for PDF document, which a user can click and open the PDF document in the browser with a PDF viewer installed, it is still link-based just like the Microsoft Office document, requiring an extra click for each PDF document, and the PDF viewer will take over the whole web browser screen. In both cases, they are not web-page native, which means that they cannot be easily embedded right inside a web page similar to a YouTube video, and not viewable until opened in an external viewer with extra clicks and context switch.

A web widget (commonly referred to simply as a 'widget') generally refers to a small program that a user can put on a website, blog, or personalized start page by include a section of html-based embed code into those containing web pages.

With the rapid development of Web technologies, enterprises are looking for, and software vendors such as IBM are starting to deliver, software environments that are so easy and flexible that it can allow just about anyone (specifically including end-users) to create software they need for a given situation with no software programming, which is generally known as situational software. The emergence of situational software reflects the increasing required capability for end-user and work teams to use their greater Web technology know-how to produce software for their working team environment that is constantly changing with respect to the dynamic situation.

SUMMARY OF THE INVENTION

One objective of the invention is to allow live information from different website or applications to be displayed on a single web-based dashboard page for easy and at-a-glance view of information from multiple web pages and information sources.

In addition, a generic solution is needed so the user can componentize any part of any web page that he has access to, then aggregate those components into his/her dashboard pages, instead of limiting to either treat the whole web page as a component based on its bookmarked URL or only those widgets from a pre-build consumer-oriented widget library. The "any part of any page" can comprise of either existing embedded objects in Web pages, such as images, video, widget, flash, iFrame, or any visual sub-region of a web page defined by its physical coordination on the page. Componentizations here generally refers to creating or reusing web-page friendly and embeddable objects from digital media and web pages.

In accordance with this and other objectives, a new method of assembling situational Web-based dashboard with a wide array of digital components is invented. The components can include, Live-area component created on-demand from any rectangular sub-region of any web page or web application, based on the "component-level visual-bookmarking" method Rich media components (rich text, video, picture, widget)

Office document (Microsoft Office documents and PDF etc.).

Each dashboard page can contain any number of components. The size, position, location and layout of the components in the dashboard can be easily configured using a computer mouse, or through a touch screen interface. The resulting dashboard can be used by the author only or shared with others with various permissions for group-based collaboration. Each component in the dashboard is capable of auto-refreshing itself from the source with a specified time interval. A set of dashboard pages can be bundle together, and automatically display in a slideshow mode on the screen to auto display and monitor large number of information.

The invention includes "component-level visual bookmarking", which lead to "creating live area component" on-demand from any sub-region of a web page. The visual bookmarking-based component-on-demand process can be accomplished in two manners:

The user can directly pick and choose any embedded object (picture, video, widget etc.) in an existing Web page by moving their mouse over the existing embedded object, then click on the "Post" button automatically showing up to visually bookmark the component. (FIG. 3a and FIG. 3e)

The user can use a computer mouse to draw a rectangular box around any sub-region of a Web page, and create a visual component on-demand, with the component displaying only that part of the web page. (FIGS. 3a, 3b, 3c, 3d, 4e)

In addition to creating components on-demand through selecting and bookmarking, a sub-region of web page or any embedded object in existing web pages, the present invention also takes a snapshot image of the bookmarked region/object in a web page, as well as record the current state of the web page when user does the bookmarking such as annotation, highlights through caching the web page's content at the moment.

As another part of the invention, multiple Office documents can be embedded right inside a web-based dashboard page, which makes those documents behavior similar to those embeddable YouTube videos, so user can see multiple documents at-a-glance right in the page, instead of just a bunch of links. The visual components can be then used for further aggregation, displaying, sharing, manipulation and organization.

The invention is a method and a user interface style that provides the users with the power, extensibility, flexibility and ease-of-use of componentizing any digital media content, Web page and Web application with just a few mouse clicks and zero programming; embedding any number of components into canvas-like Web-based dashboard pages; and then view, manage, interact and share them. The actual components that can be embedded is very generic with the invention, which includes any sub-region of any live web pages; any existing embeddable objects (picture, video or widget) from other web pages; and any photo, video or Office document in user's computer through an uploading process.

The resulting dashboard pages can contain both static content and live dynamic applications. The user does not need to go to each web site or open each rich media one-by-one. The at-a-glance view of multiple information pieces from different web sites and information sources at the same time adds significant value by delivering multiple information to users more effectively. The resulting dashboard pages can be used for publishing and sharing purpose, or for monitoring and display purpose. Furthermore, when combined with touch-screen user-interface, those situational dashboards can be a powerful way for presentation, interaction and collaboration.

BRIEF DESCRIPTION OF THE DRAWINGS

Figure 1A:
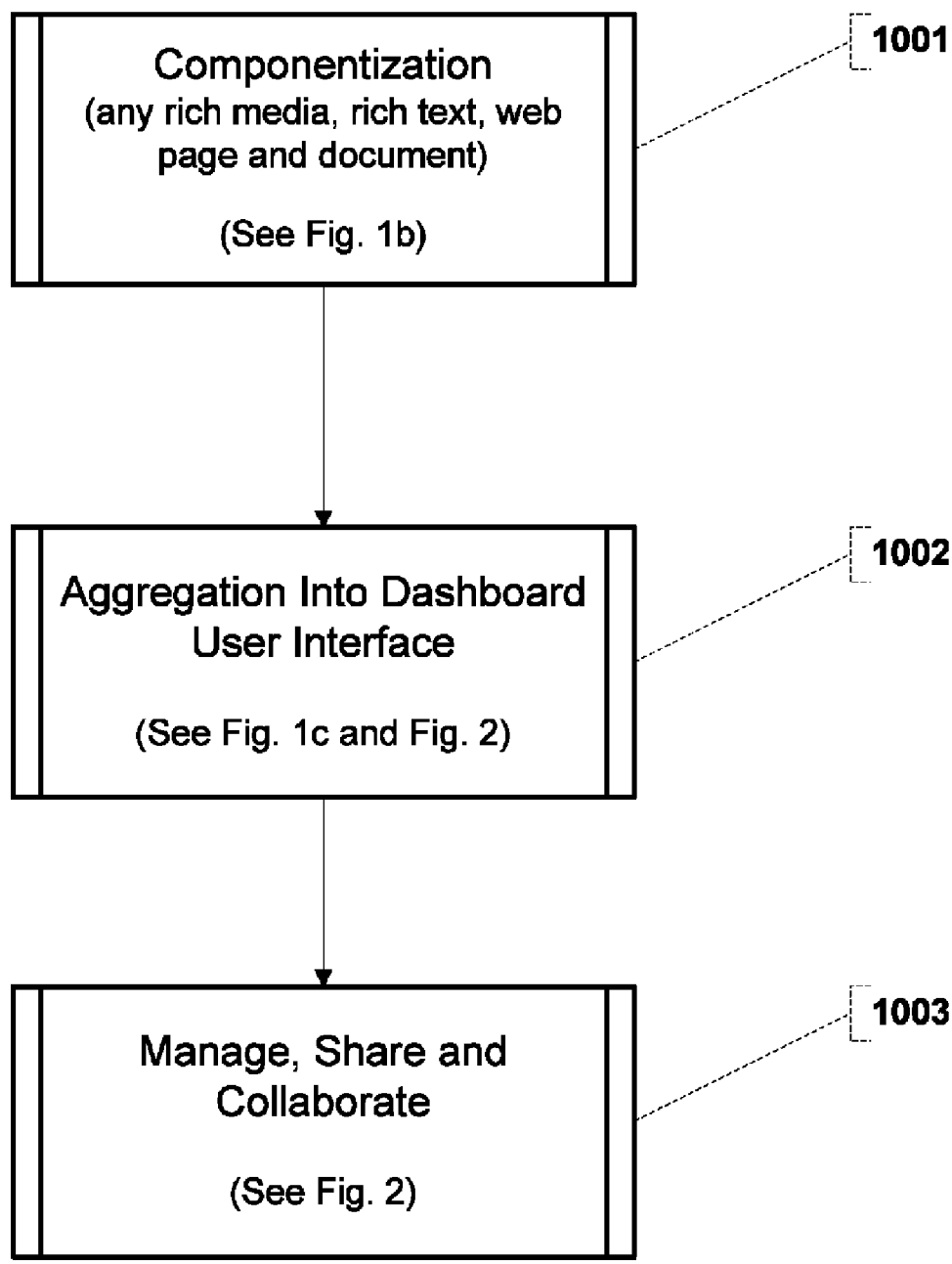
Figure 1B:
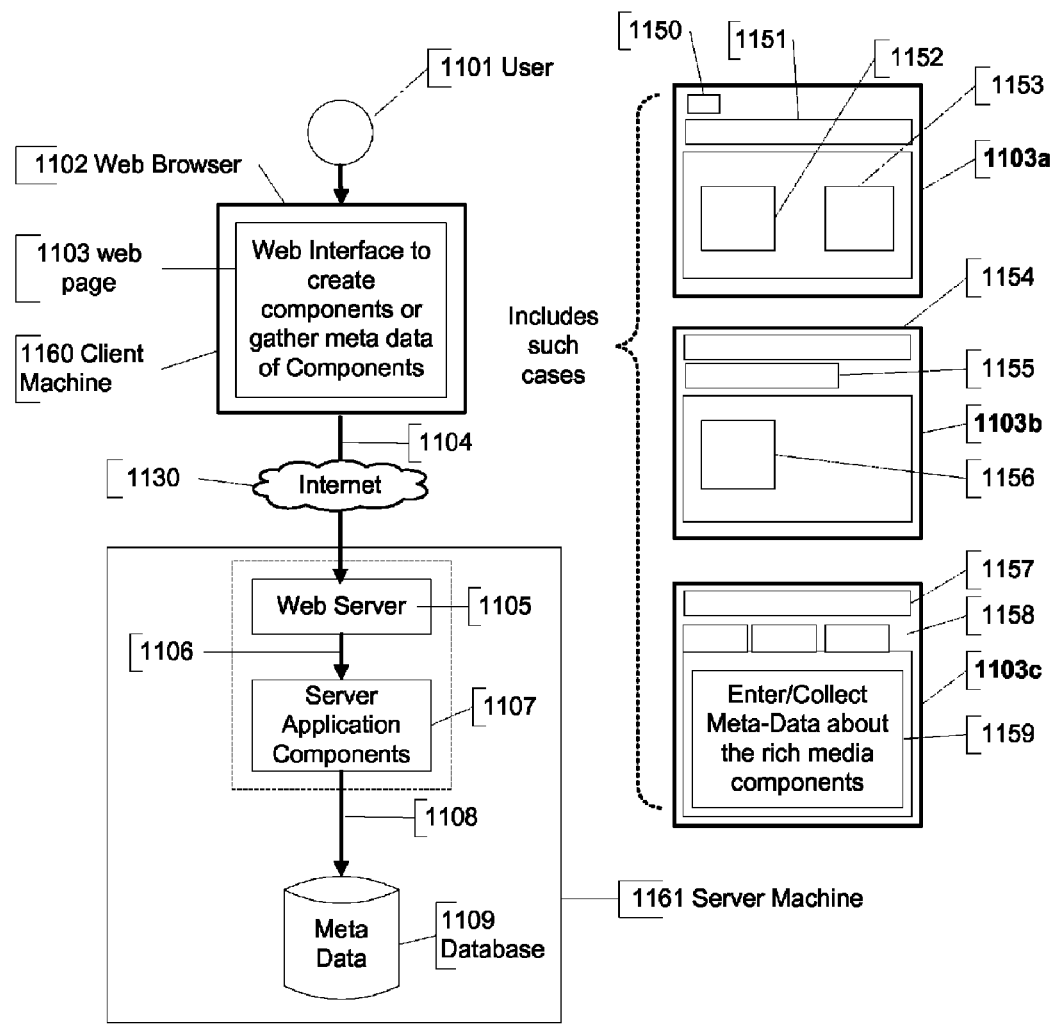
Figure 1C:
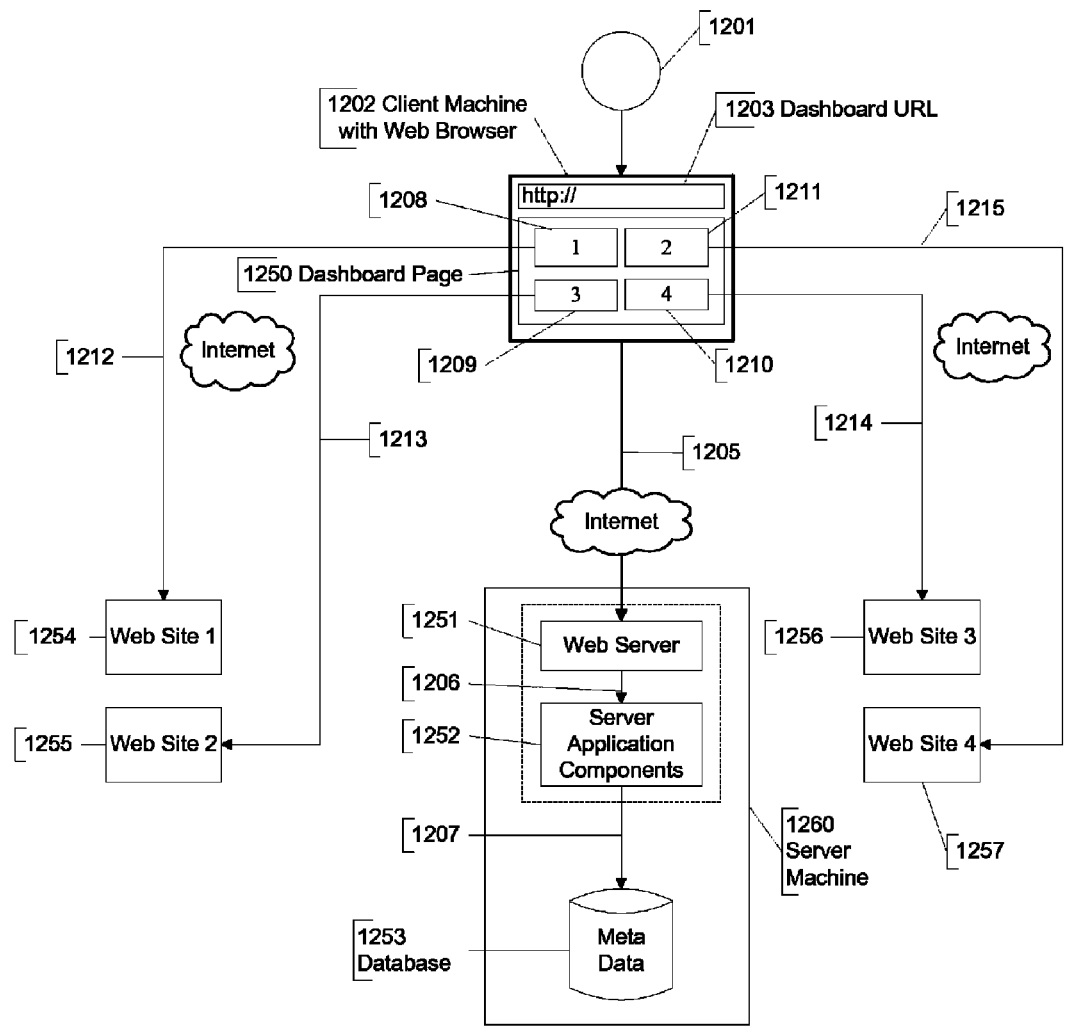
Figure 2:
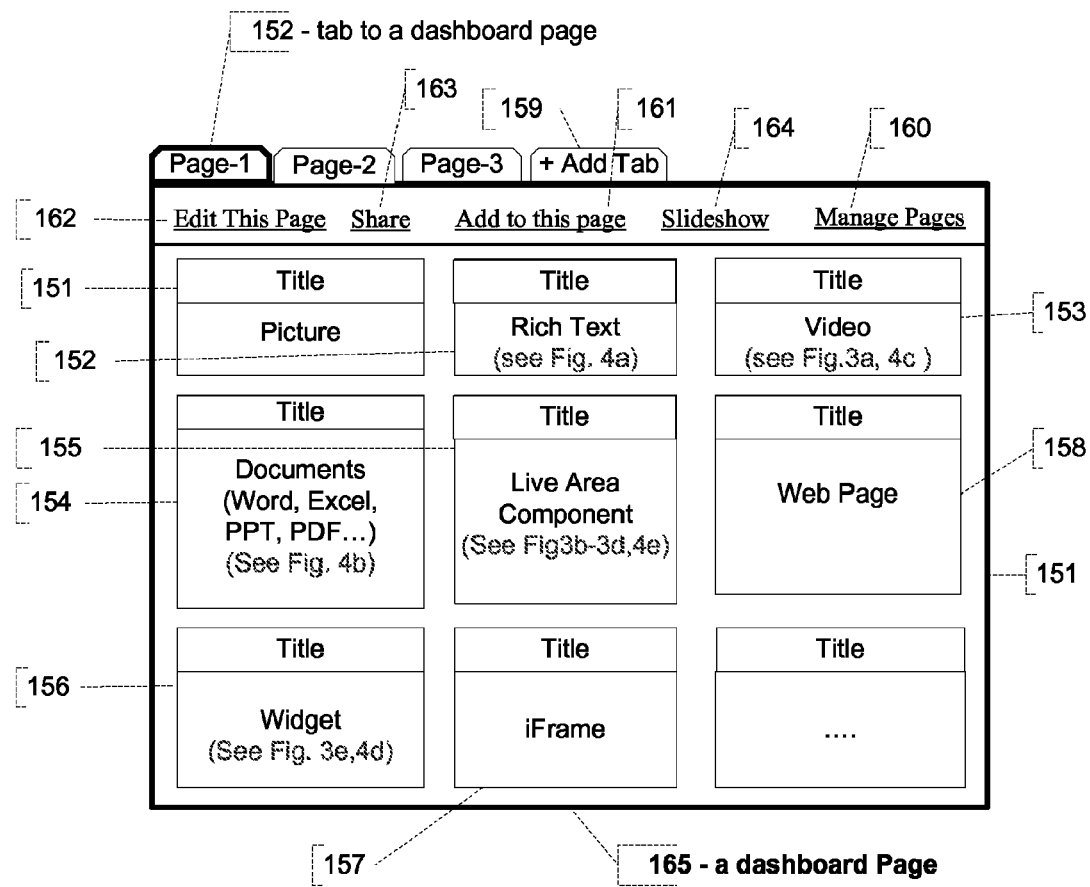
Figure 3A:
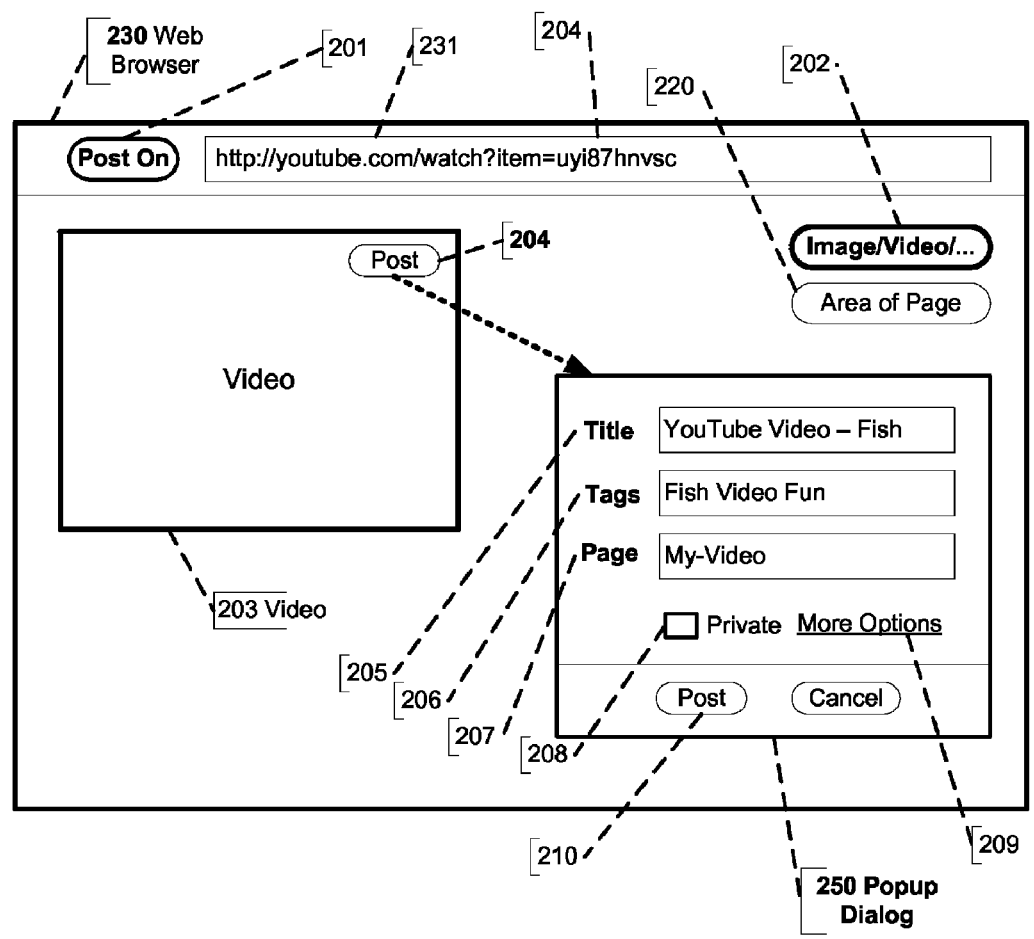
Figure 3B:
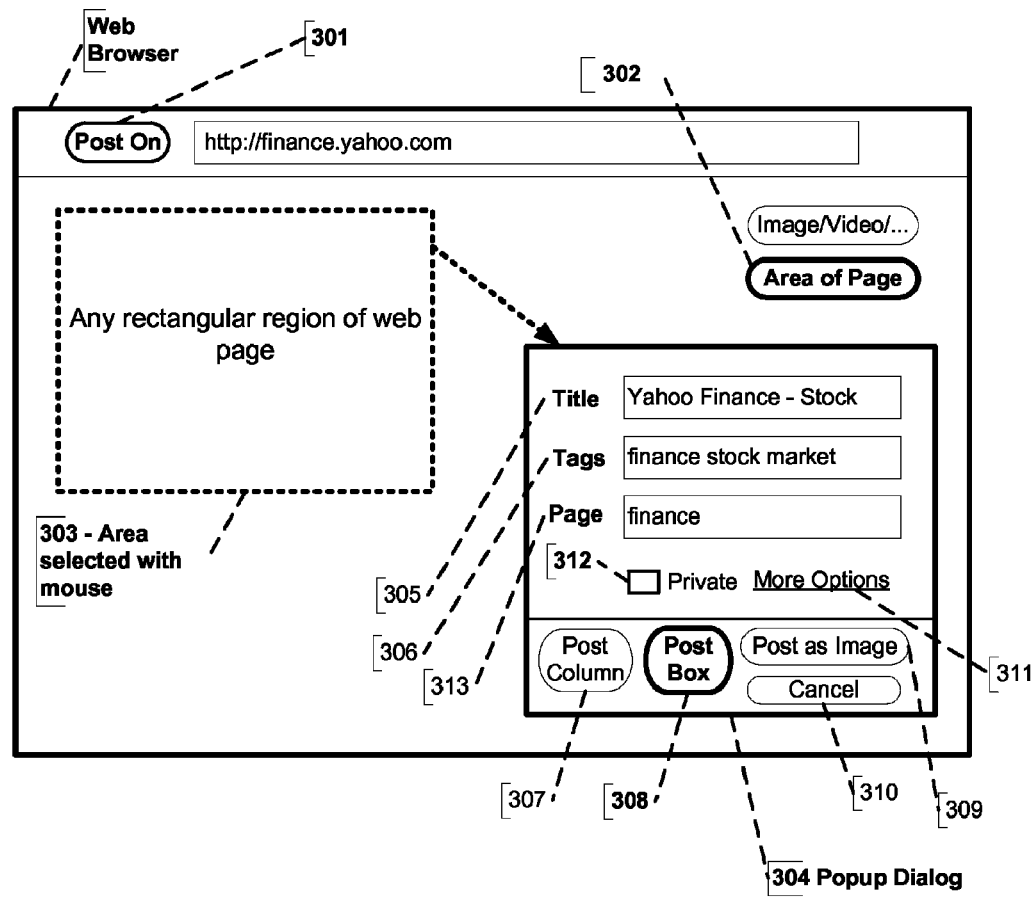
Figure 3C:
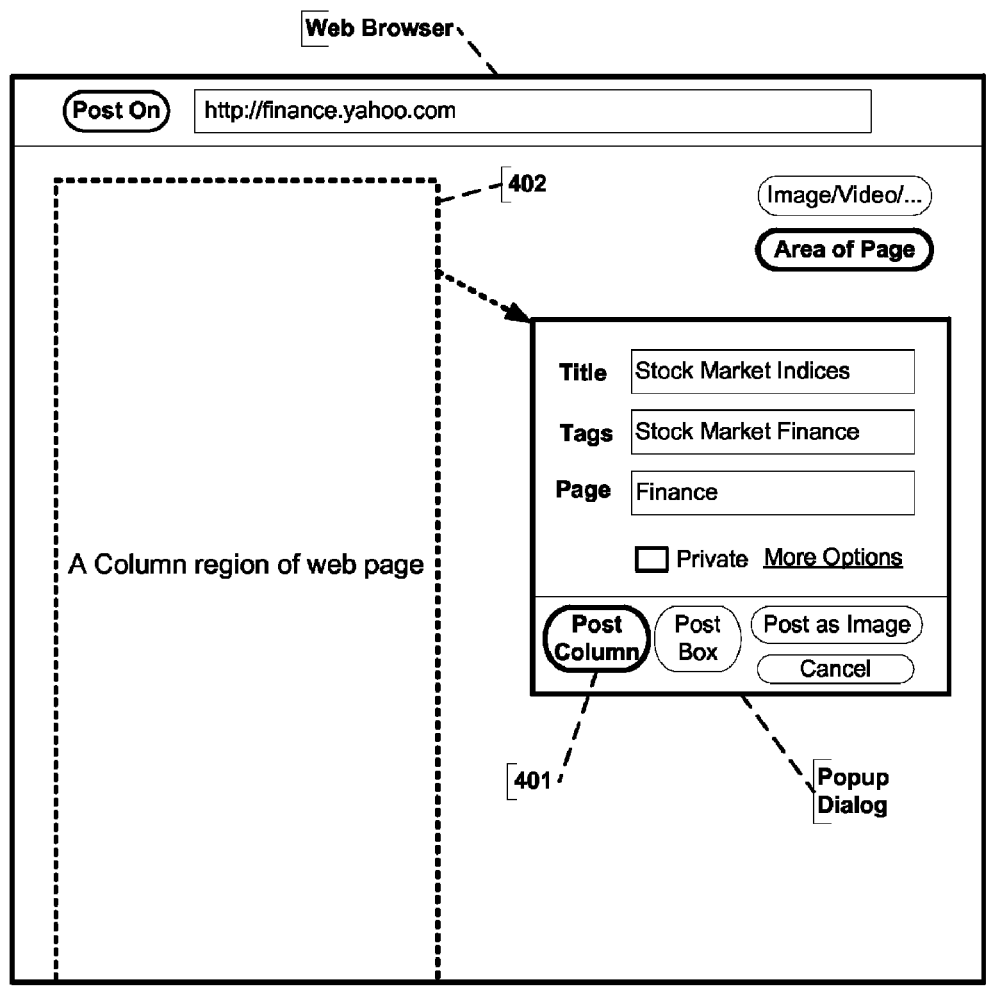
Figure 3D:
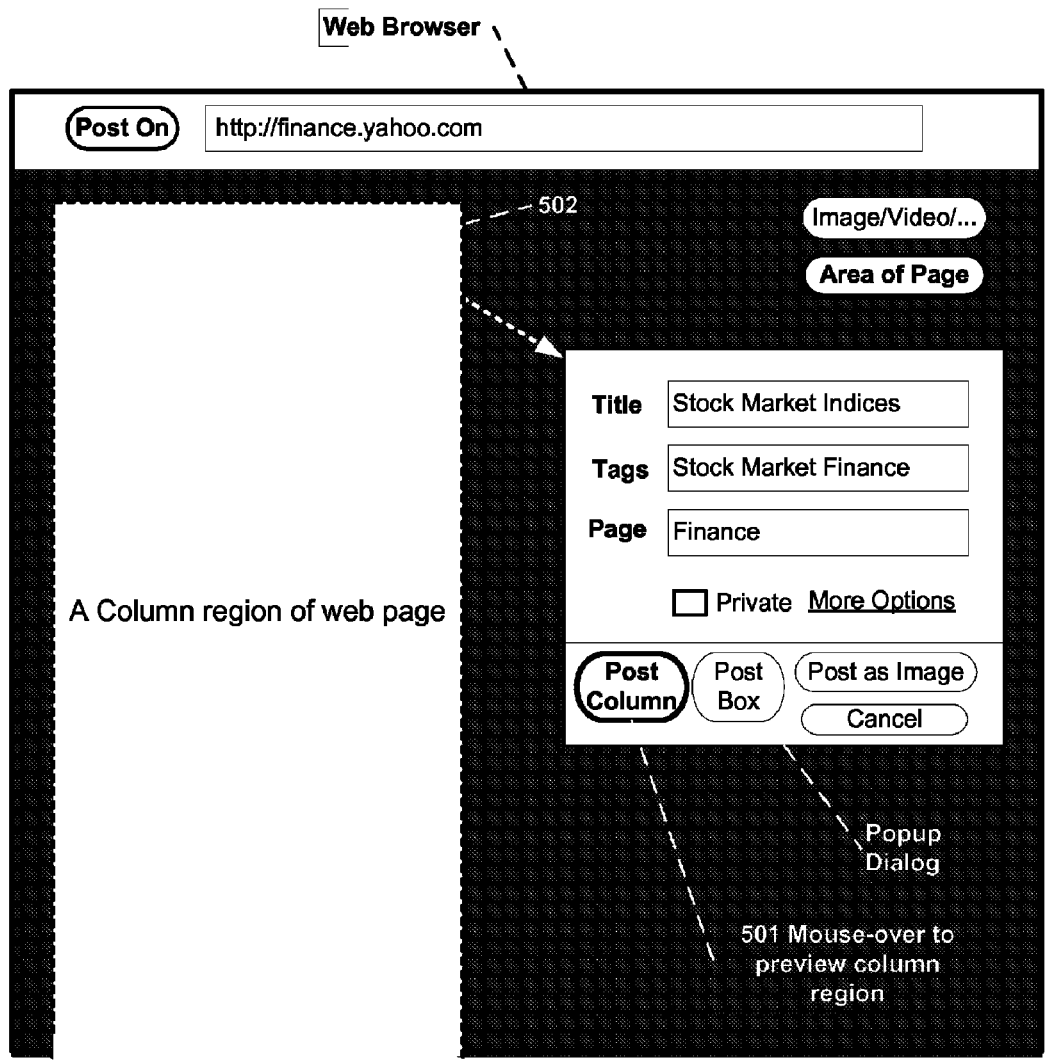
Figure 3E:
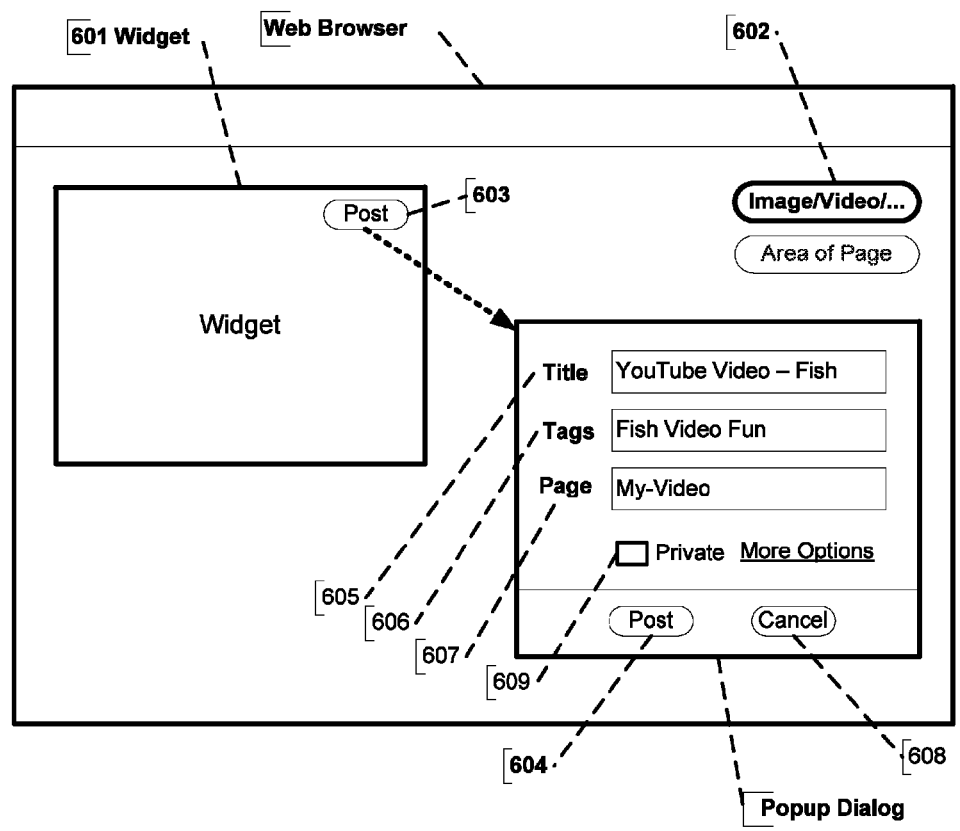
Figure 4A:
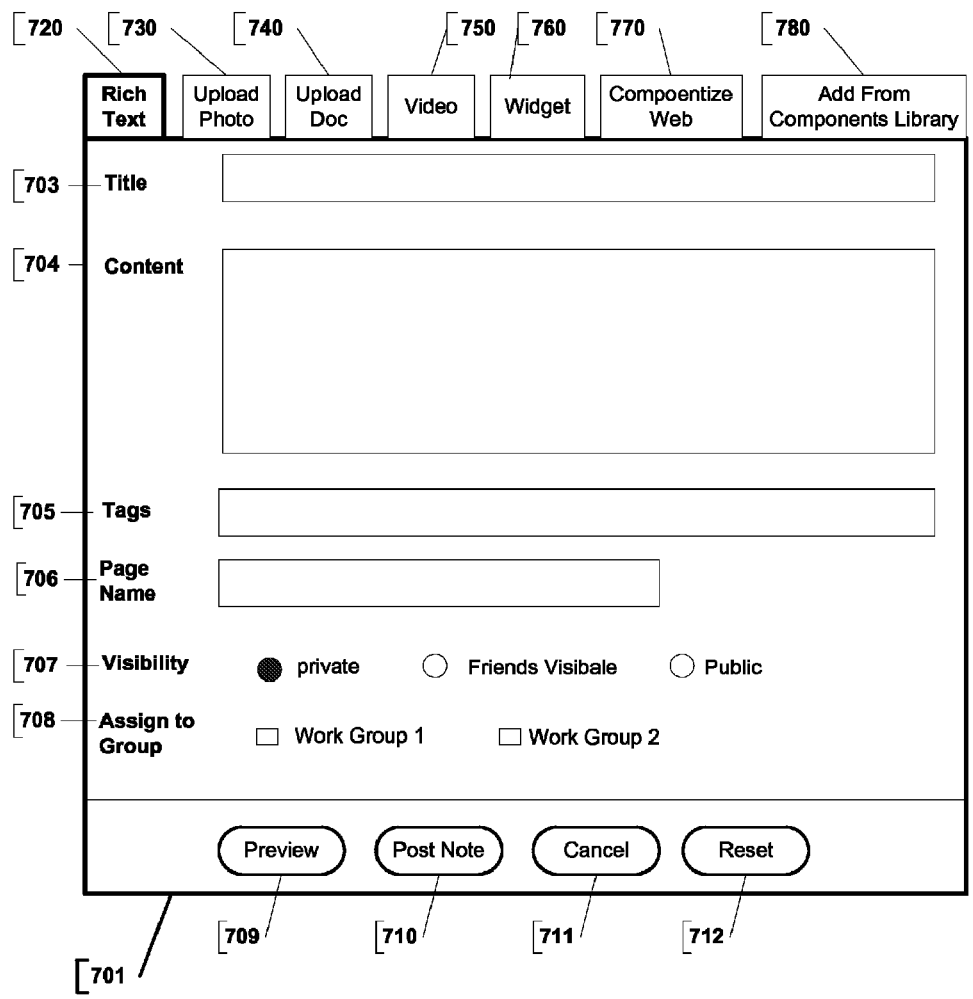
Figures 2, 4B:
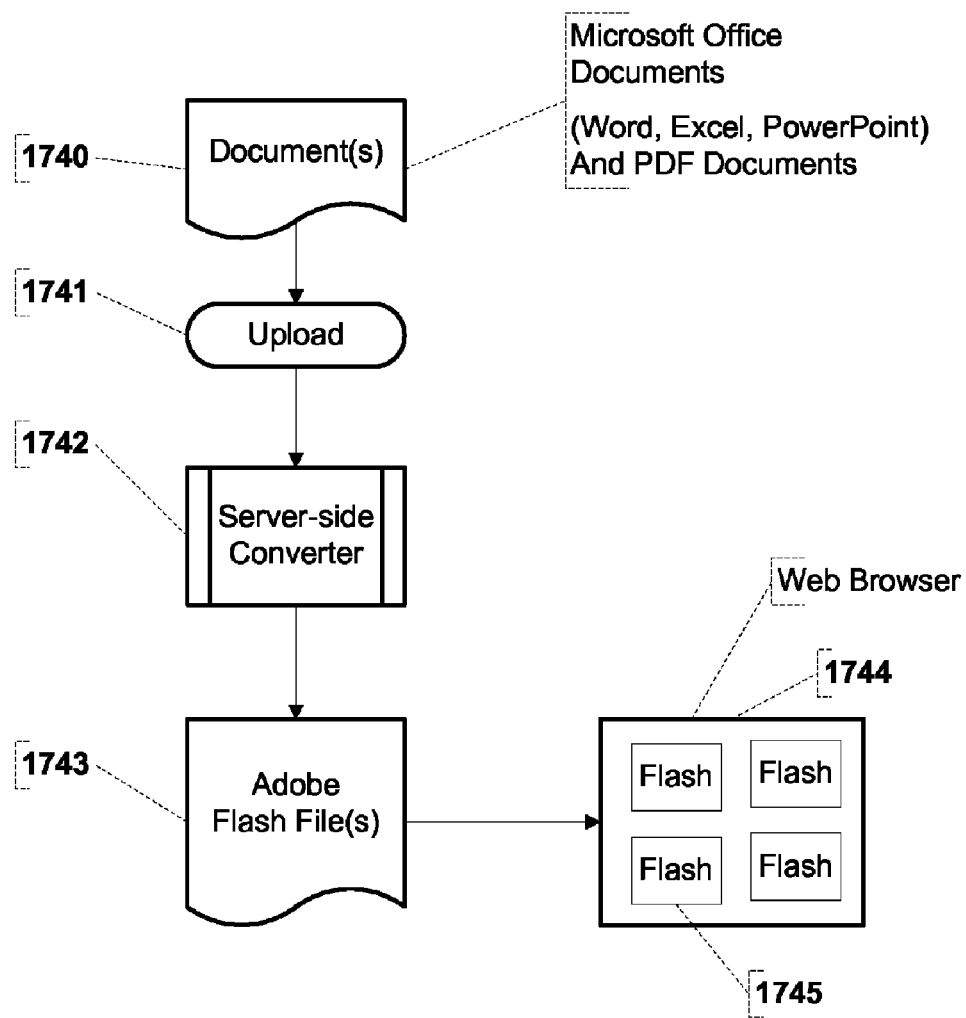
Figure 4C:
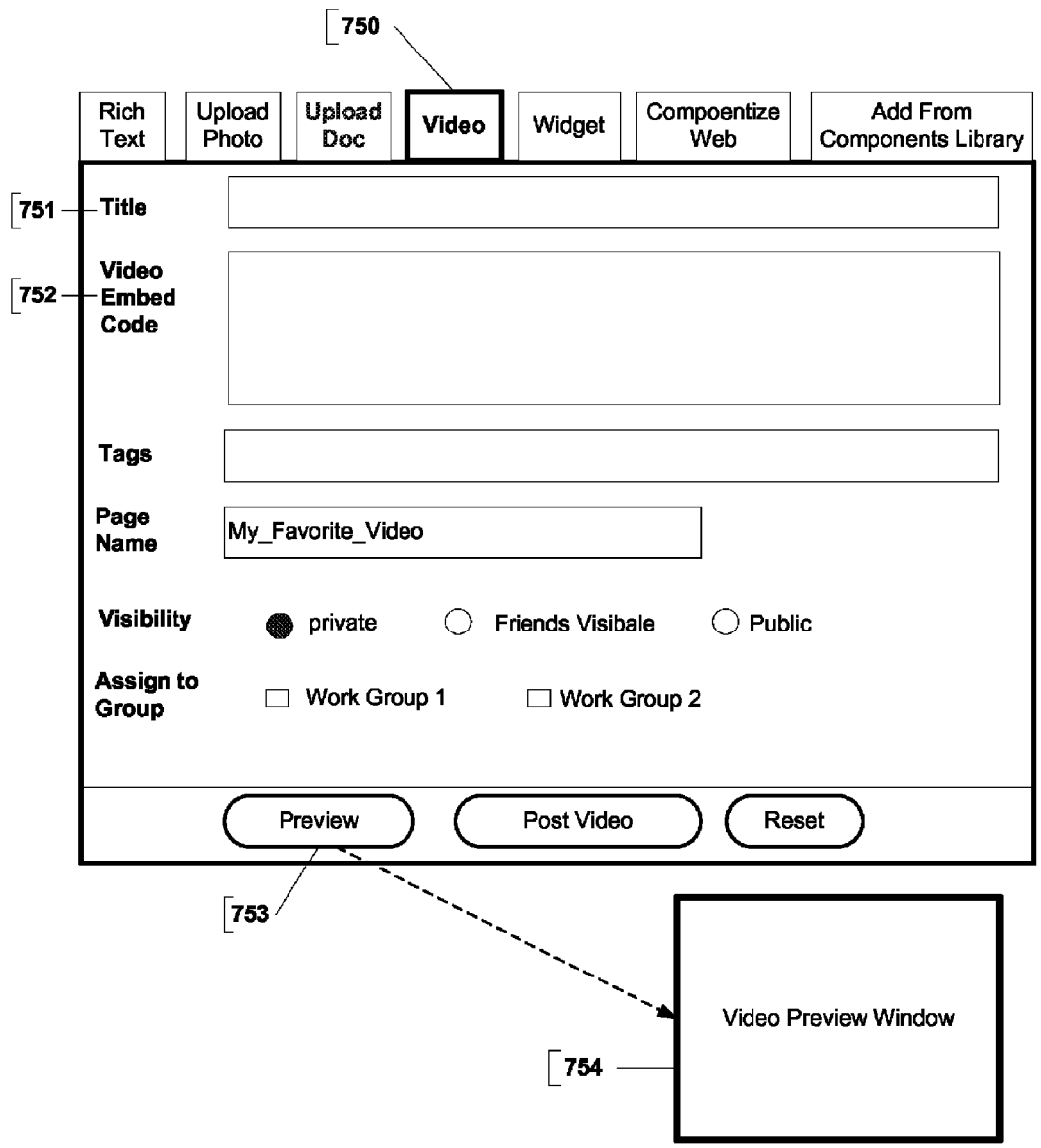
Figure 4D:
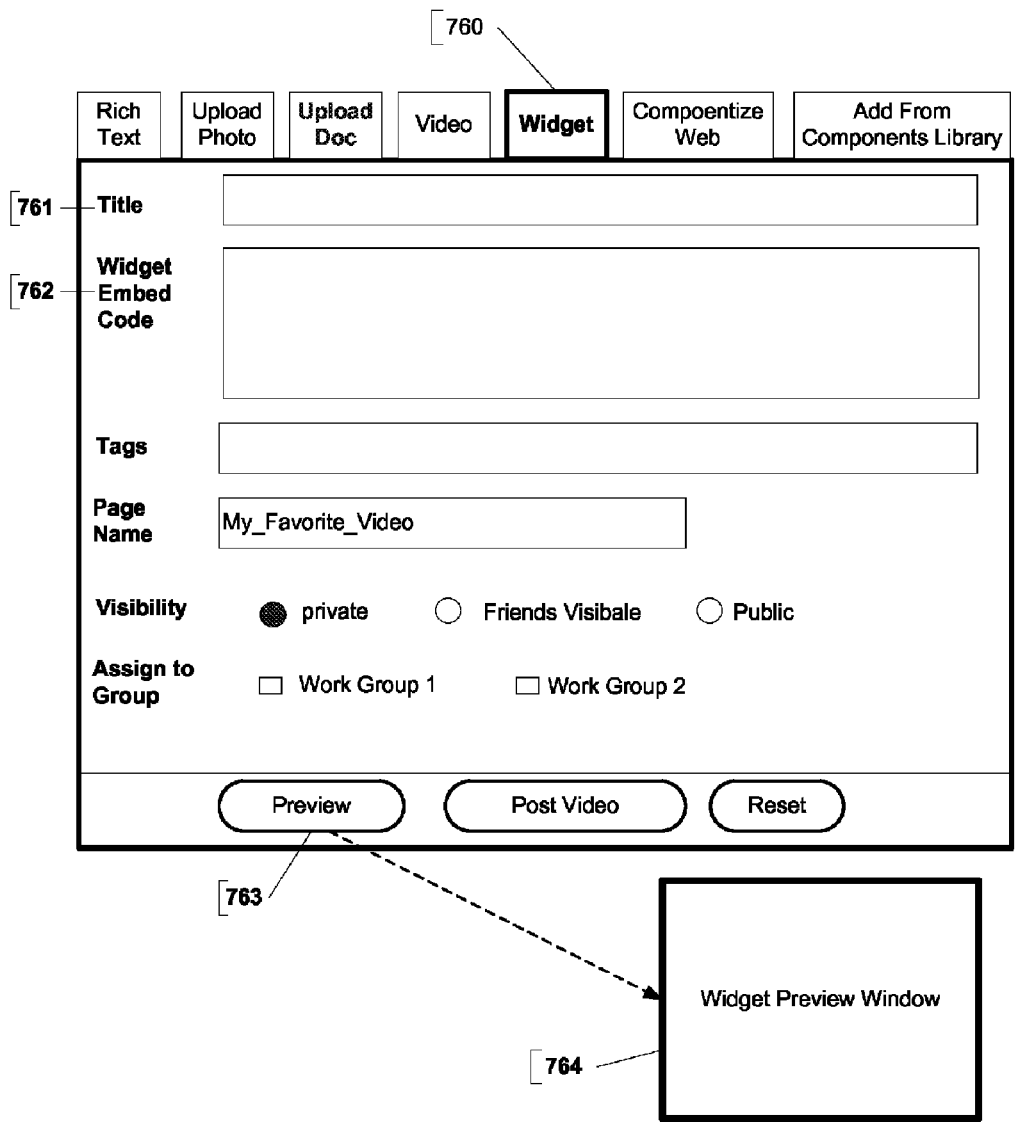
Figure 4E:
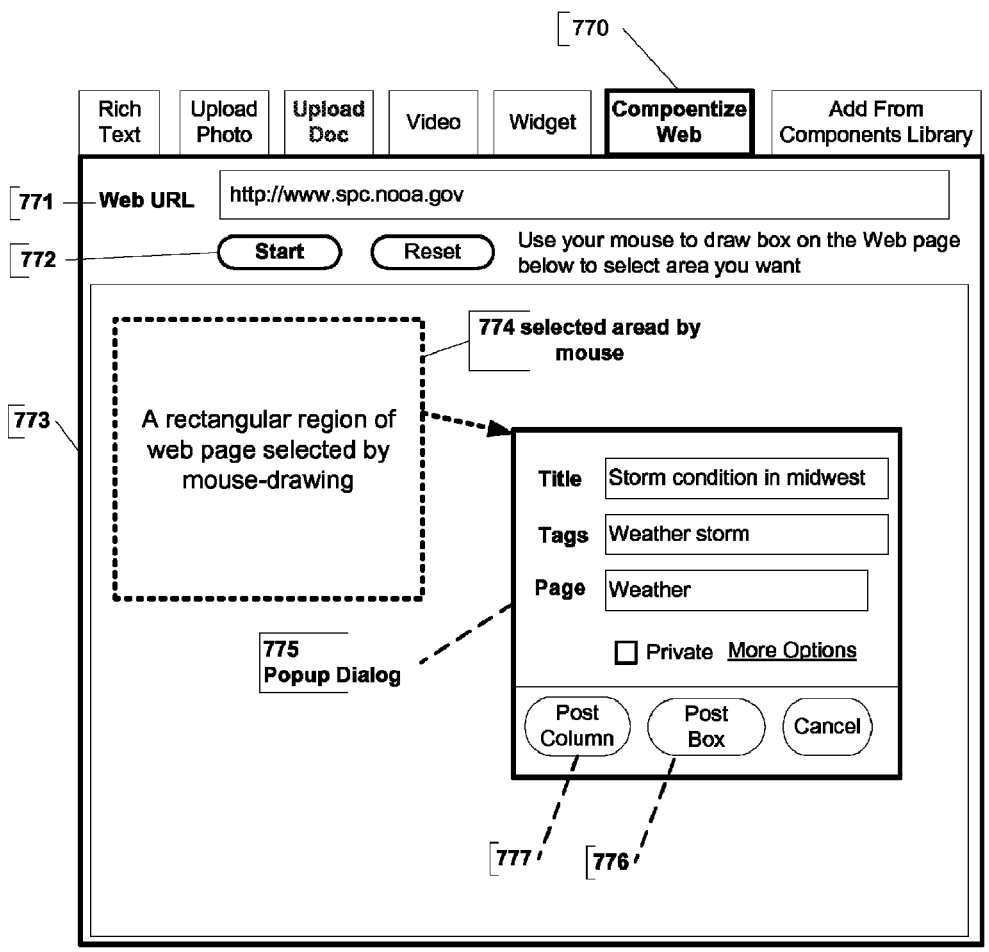
Figure 4F:
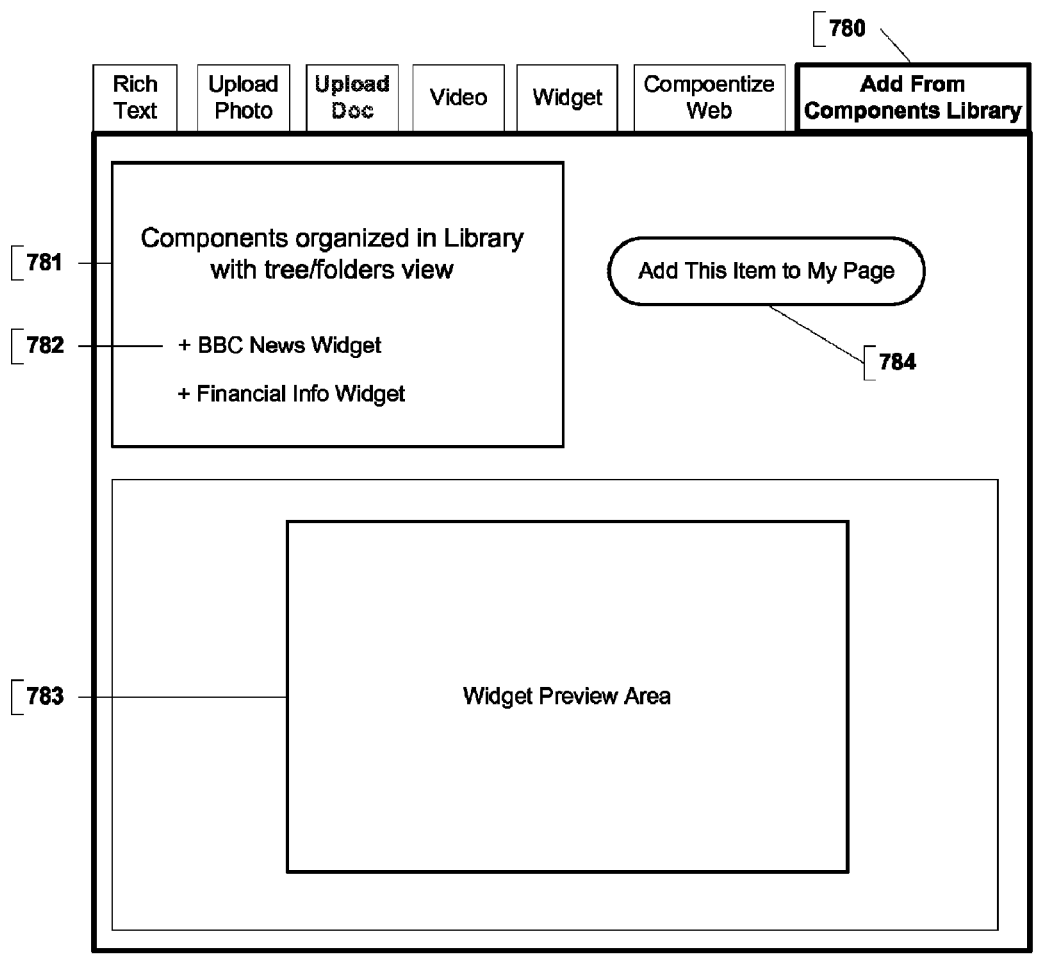

Having thus described the invention in general terms, reference will now be made to the accompanying drawings, which are not necessarily drawn to scale, and wherein:

FIG. 1a is a flow chart illustrating three keys steps of assembling situational Web-based dashboard, namely, componentization, aggregation, and management/sharing;

FIG. 1b shows schematically a block diagram of how the system enables a user to create and add components from other web pages or information sources, and how the system's server saves the information of components into the database, which will be used for assembling into dashboard pages on-demand at real-time;

FIG. 1c shows schematically a block diagram of how the system can assemble and display a dashboard web page containing several visual components by leveraging the metadata stored in the database, and dynamically render each component independently in the dashboard page with real-time sourcing of information from different web sites;

FIG. 2 shows schematically a block diagram of a layout of dashboard page, containing a number of components with various component types on the dashboard page;

FIG. 3a illustrates the user interface of clip and create a video component on-demand through visual bookmarking from an existing Web page (231) that contains/embeds a video object (203), with the support of a browser add-on (201);

FIG. 3b illustrates the user interface of how the system enable a user to create a live area component on-demand through "component-level visual bookmarking" on a Web page by drawing a box around the region of interest (303), with the support of a browser add-on (301);

FIG. 3c illustrates the user interface of how the system enable a user to create a live column component on-demand through "component-level visual bookmarking" on a Web page by drawing a box around the region of interest (402), then select the option of "Post Column" (401) with the support of a browser add-on;

FIG. 3d illustrates the how the system display a preview of the column region (502) on the screen when a user moves his cursor over the "Post Column" button, but before the user clicks the "Post Column" button (501). This is the same screen as FIG. 3c except doing preview of the component first with the system reacting to the mouse-over event;

FIG. 3e illustrates how the system enable a user to clip and create a widget component on-demand through visual bookmarking on a Web page that contains/embeds a widget object (601), with the support of a browser add-on;

FIG. 4a illustrates the user interface of how the system enables a user to add a rich-text-component to a specified dashboard page on-the-fly;

FIG. 4b1 illustrates the user interface of how to upload and add a document as a component to the dashboard on-the-fly;

FIG. 4b2 is a flow chart illustrating the number of steps of how an uploaded document (1740) get converted into Adobe Flash format by the system on the server side (1742), and then delivered to a Web browser on-demand as an embedded object (1745) of a dashboard page;

FIG. 4c illustrates the user interface of how the system enable a user to add a video into the dashboard page by copying and paste the video's embedded code (752), and the system saves the related metadata to database for the video component;

FIG. 4d illustrates the user interface of how the system enable a user to add a widget into the dashboard page by copying and paste the widget's embedded code (762);

FIG. 4e illustrates the user interface of how the system enables a user to create a live area component on-demand from a web page, without the need of installing any Web browser add-on;

FIG. 4f illustrates the user interface of how the system enable a user to select from a library or catalog of components pre-populated by administration users, preview any component in it, and then add to the dashboard page easily with one-click;

DETAILED DESCRIPTION OF THE INVENTION

The present inventions now will be described more fully hereinafter with reference to the accompanying drawings, in which some examples of the embodiments of the inventions are shown. Indeed, these inventions may be embodied in many different forms and should not be construed as limited to the embodiments set forth herein; rather, these embodiments are provided by way of example so that this disclosure will satisfy applicable legal requirements. Like numbers refer to like elements throughout.

FIG. 1a is a flow chart illustrating three keys steps of assembling situational Web-based dashboard, namely, componentization 1001, aggregation and re-mixing 1002, and management/sharing 1003. The componentization process 1001 refers to the transformation or conversion of various content, media, and web page or web application into Web-friendly components, which can later be embedded as part of another Web page's HTML code, and rendered directly and visually right in the Web browser as part of that containing web page, occupying part of the real estate of the screen, without the need to click and open it in another web page or external application.

The sources of components include the following categories:
- current native web content, such as HTML rich text (FIG. 2, 152) and picture (FIG. 2, 151)
- current web-embedded object such as video (FIG. 2, 153) and widget (FIG. 2, 156)
- web page as a whole through a iFrame (FIG. 2, 157)
- rectangular sub-region of any web page (FIG. 2, 155)
- Office documents such as Microsoft Word, Excel, PowerPoint and PDF documents. (FIG. 2, 154)

FIG. 1b describes in more detail how the system works to create and save components. The aggregation process 1002 takes advantage of the components generated during the componentization step as described above, then presenting multiple components on canvas-like Web-based dashboard pages, which enable human users to view or interface with multiple components at-a-glance, and drill down to a specific one if needed. FIG. 1c will describe in more detail how the system generates a dashboard containing multiple components at real-time using the metadata stored in the database.

The management, sharing and collaboration process 1003 enable users to manage the size, look and feel, refresh rate of each component, or the layout and style of the containing dashboard pages. It also can enable users to selective share and publish dashboard pages with different permissions for collaboration with others.

Specifically, users can
- Change the size and location of each component on the canvas via drag and drop
- Change the layout of the dashboard such as number of columns; can add, remove or hide components on the dashboard pages.
- Set up auto-fresh timer for each component. This also ensures user's web sessions will not timeout for web sites requiring login and with session timeout.
- Group a set of dashboard pages together, and publish them as a bundle to others,
- Group a set of dashboard pages and auto-play them in a slideshow mode. Each dashboard can contain both static and dynamic content and application syndicated from any number of Web sites, which is much more advanced and powerful than photo slideshow or PowerPoint slideshow.
- Preserve and re-display the saved (cached) state of web page at time of bookmarking, which reflects the efforts of the users at that point of time of bookmarking. Such efforts include but not limited to: highlights, annotations, and indication of which region of the web page was interesting.

FIG. 1b shows schematically a block diagram of how the system enables a user to create and add components, and how the system reacts to process the request and save the metadata into database. The drawing contains three major modules:

> The end users who are using the system to create components (1101)
>
> The client computer (1160) on which a web browser is used to display web page (1103 with three variations: 1103*a*, 1103*b*, and 1103*c*)
>
> The server computer (1161) that contains the Web Server, the Server Application Components, and the database server.

When a user (1101) is using a web browser on a client machine (1160), the user can access a web-based interface (1103) (the details of this interface are described below) to create a web component, and make the request, the Web browser sends a HTTP request (1104) across the Internet (1130) to the dedicate Web server (1105). The HTTP request (1104) contains all the important and related metadata such as title, tag, description, security selection, URL, or embedded code or source document to the Web server 1105 as part of the server machine 1161.

The Web Server 1105 will in turn invoke corresponding Server Application Components (1107), also running on the server machine 1161. Based on the type of the actual data from the browser, the Sever Application Components will then update the database (1109) with the corresponding metadata of the submitted component. The meta-data includes all the information related to the component that is sufficient to re-construct the component visually and functionally inside a Web page when loaded in a web browser. The details of meta-data for each type of components will be described later.

The actual implementation of the Web interface to create components (1103) can have three different techniques.

> Create live area components (FIG. 2, 155), or clip components such as video (FIG. 2, 153) or widget (FIG. 2, 156), from existing web pages with the help of a browser add-on
>
> Create live area components (FIG. 2, 155) from existing web pages without installing any browser add-on
>
> Create new components not from information sources other than from existing web pages The first technique (1103*a*) is to create components from existing web pages with the help of a browser add-on (1150). The resulting components which will show up in a dashboard page as a live are component (FIG. 2, 155); or video (FIG. 2, 153) or widget (FIG. 2, 156).

A user visits a web page with the URL (1151) of the page in the browser; he can click on the Web browser's add-on button (1150) to enter the componentization mode with two options represented by two buttons displayed by the system. If the user selects the first option, the system draws a semi-transparent canvas layer on top of the existing web page; also turn the cursor's icon from a pointer into a cross. The user can draw a box around any rectangular region of the Web page using a mouse, then click on the 'Post' button. The system will capture the following key metadata: the URL of the source Web page, the width and height of the web page, the width and height of the box the user drew; the offset of the location of the box from the upper left corner of the web page. The system will save all the metadata with the help of server (1161) to create a new component on-demand.

If the user selects the second option, the system will do a quick browser side Document Object Model (DOM) analysis of the current Web page; identify the entire DOM objects contained in the web page. Specifically, the system can focus on DOM object corresponding to HTML tags of <img>, <embed> and <iFrame>. If the user moves his mouse over an existing object such as an image or a video matching the tag of interest, the system will draw a red-color border around the object, and also show a "Post" button next to the border. If user clicks on the "Post" button, the system will capture the following key metadata: the URL of the source Web page, the URL of image if an image was selected, the embed code of the object (video or widget) if an embed object is selected.

In both cases, after the user clicks on "Post", a request will be send from the browser on the client machine (1160) to the server machine (1161). The request contains all the key metadata as described above. After the server (1161) receives the meta-data about this existing component on that Web page, it will process it and save them to the database (1109) as described above. The details of those are covered later in FIG. 3*a*-FIG. 3*e*.

The second technique (1103*b*) is to create new live area components from existing web pages without installing any browser add-on. The resulting components will show up in a dashboard page as a live area component (FIG. 2, 155). A user can copy and paste the URL of a web page he is interested into the URL text input box of a "Add Component Web Page" (1154), the system will load the targeting page inside the "Add Component Web Page" (1154), add a semi-transparent layer as canvas. The user can draw a box around a region with mouse. The system will show a "Post" button next to the region. The user can click on the "Post" button to send the request to the server (1161). The system will capture the following key metadata: the URL of the source Web page, the width and height of the web page, the width and height of the box the user drew; the offset of the location of the box from the upper left corner of the web page. The system will save all the metadata with the help of the server (1161) to create a new live area component on-demand. Further details are covered in FIG. 4*e*. The server processing after the request is submitted in 1103*b* is the same as 1103*a*. The difference here is the user interface steps and the client-side processing with and without a browser add-on available.

The third technique (1103*c*) is to create new components from information sources other than existing web pages. It includes three cases:

> Manually copying and pasting the embed code of objects such as embeddable video (FIG. 2 153), widget (FIG. 2, 156). (See FIG. 4*c* and FIG. 4*d*)
>
> Upload a document (FIG. 2, 154) from own computer. (See FIG. 4*b*-1, 4*b*-2)
>
> Type rich text content (FIG. 2, 152) directly. (See FIG. 4*a*)

FIG. 1*c* shows schematically a block diagram of how the system can assemble and display a dashboard page containing several components by leveraging the metadata stored in the database, and dynamically rendering each component independently in the dashboard framework When a user (1201) using a web browser on a client machine (1202) enters the URL of a dashboard page in the URL field (1203) of the browser, the Web browser will locate the Web Server (1251) running on the server machine (1260) based on the hostname part of the URL and make the HTTP request on behalf of the user. The Web server (1251) will extract the unique path and name of the dashboard web page from the URL submitted, and invoke (1206) corresponding Server Application Components (1252), which will in turn look up (1207) in the database (1253) for the related metadata for the dashboard page. The metadata that are retrieved from the database includes:

> Requesting user's permission to access the dashboard page
>
> The number of components this dashboard page contains
>
> The style and layout for this dashboard page Displaying location and sequence of each component relate to each other in the dashboard page Component type of each of component The size and visible area of each component Source information (Source URL)

Specific content information for each type component (URL for a picture or a web page; embed code for a video and a widget; coordination, offset and size for a live area component; actual rich text for a rich text component; embeddable Flash content for a document uploaded and converted)

Refresh rate of each component

The security control and permission for each component

Slideshow information for this page

If the user has the right permission to access the dashboard page, the corresponding server application components will generate an AJAX-based Dashboard Page (1250) to be rendered in the Web browser (1202). This AJAX-based dashboard page (1250) will use the metadata above, specifically leveraging the source information of each component, and retrieve the corresponding latest state from each source asynchronously, and then display it in each component.

In the FIG. 1c example, the requested dashboard page contains four components from four different web sites based on the metadata retrieved from the database (1253). For "component 1" (1208), its source is from "Web site 1" (1254), so the Ajax-based Dashboard Page (1250) will make a HTTP request (1212) to the "Web Site 1" (1254)'s specific Web page or web component, and display it in the visual area of "Component 1" (1208). The same sequence applies to "Component 2" (1209), "Component 3" (1211) and "Component 4" (1210).

FIG. 2 shows schematically a block diagram of the layout of dashboard pages, containing any number of multiple types of components in dashboard web pages. It enables users to see multiple information components at-a-glance, even the information are coming from disparate web sites or sources.

A dashboard page can be accessed from any Web browser (Internet Explorer, Firefox, Safari, Chrome etc.) on a client computer or from a web-enabled mobile device such as a iPhone, or a Blackberry.

A dashboard represents the outcome of the "aggregation and remixing" process 1002 of FIG. 1a, as described in detail in FIG. 1c. It can contain following modules:

Tabs of dashboard pages: for each organizing and navigating between different dashboard pages Control area: contains the control icons for manage the layout, visibility, sharing, security, refresh rate of each page; and link to adding new components to the dashboard Main display area of a specific dashboard page: containing any number of components with different component types.

The control area can contain following controls related to the "Management, Sharing and Collaboration" process 1003 of FIG. 1:

Edit This Page (162). If a user clicks on it, a popup will show up and allow user to change the name, layout (flow of components, number of columns), permission, style of the page, visible or hide from tab list, order in tabs of each page Share This Page (163), if a user clicks on it, a popup will show up, and allow user to specify who else have access to the page with what kind of access permission Slide Show (164). If a user clicks on it the system will activate the slide show mode to auto display a subset of dashboard pages (tabs) automatically. Manage Pages (160): If a user click on it, a popup will show up enable the user to manage the overall dashboard pages properties such as what pages to display or hide, in what displaying order, bundling of a sub-set of dashboard pages and publish them into a single URL, mass delete multiple pages etc.

With each of the controls, there are corresponding server side application components. When a control is manipulated from the dashboard user interface and the results are saved by the user, a corresponding request will be sent to the Web Server first via HTTP, which in turn will find the corresponding Server Application Components, and pass the parameters and any changes to the right server application component. The Server Application Components will interpreted the request and changes, and update the database accordingly as illustrated in the 1161 server machine box of FIG. 1b.

The dashboard area's user interface contains multiple dashboard pages, organized in navigational tabs (152). Each tab (152) is corresponding to a specific dashboard page (165). A dashboard page (165) can contain any number of components with the following types: (1) picture 151; (2) Rich Text 152; (3) video 153; (4) documents 154; (5) widget 156; (6) live-area components created from any sub-region of a web page 155; (6) other web page 158; (7) iFrame-based content 157. If user clicks on the "Add a tab" (159), the system will create a new tab (159).

The dashboard page is very visual, user can drag and drop any component to any location or row/column he likes, and also visually drag the border of a component and increase/decrease the size of each component easily. When a user uses the mouse to drag the border of a component to visually increase/decrease its height or width, then release the mouse button, an event is triggered to the dashboard page, the system will send an AJAX request to the Web Server (1105) and Server Application Components (1107) running the server machine (1161) as illustrated in FIG. 1b to update those parameters of the component in the database.

FIG. 3a illustrates the user interface of clipping and creating a video component on-demand from a video object embedded in an existing web page. (Also see FIG. 2, 153). With the help of a browser add-on (201) installed on the web browser (230), the system can extract the metadata of an embedded object in an existing web page and save them to the database, without requiring the user leave the web page.

The user activates the browser add-on (201) by clicking on it, in response to that, the system displays two new buttons on top of the Web page for creating different types of component. The first button is "Image, Video and other embedded objects" (202). This is the button selected by default. The second button is "Area of Page" (220), which needs to be clicked by the user to be activated.

With the button of "Image, Video and other embedded Objects" (202) selected, as user moves the cursor over the web page, the system will dynamically analyze the web page's DOM structure corresponding to the location of the cursor at real-time basis. If the system finds out the cursor is over an embedded object such as an image or an embedded video, it will automatically draw a red-colored border around that object, visually indicating that object. A "Post" button (204) will also show up automatically next to the border. If the user moves the cursor out of the region of that embedded object, the red border and "Post" button will disappear.

With an embedded object identified by the system, and the user clicks on the "Post" button; the system will show up a pop-up dialog (250). The dialog enables the user to enter data such as a title (205), keywords-based tags (206), and dashboard page's name where this video will show up (207, corresponding to the tab 152 in FIG. 2). After the user clicks on the "Post" button (210) to submit the request, a set of parameters are submitted to the server including the embed code of the detected object, that is contained in the originating Web page; plus the user entered data such as the subject, tags, dashboard pages it will show up etc; the URL of the original containing page etc. The server will create a new entry in the database for the new video component as done in the server machine (1161) of FIG. 1b The system will display the video component as part of the specified dashboards, just as a "video" component (153) on FIG. 2.

The user can change the permission and group sharing of the new component by clicking the "private" checkbox (208) or "more" link (209) to get additional options. For example, a user can decide that this component should be visible to a few selected working groups he belongs to. He can click the "more" link to get an expanded control, the user can make the changes and save them. The system will send the updated security and visibility metadata to the server, and saves them into the database. For example, if a component is marked as "Private", it means that only the owner of the component can view it when view this component specifically.

FIG. 3b illustrates the user interface of creating a live area component on-demand through "component-level visual bookmarking" on a Web page. (Also see FIG. 2, 155). The user can activate the browser add-on (301), the system will show two buttons "Image/Video . . . " and "Area of page". The user can select the "Area of page" option (302), then drawing a box around the region of interest (303), the system will generate a popup dialog (304). The user can enter a title (305), keywords-based tags (306), dashboard page name where this live component will show up (313), then click on the "Post Box" button (308) to submit the request. The system will submit a set of key metadata to the server including:

- The type of component, in this case it is a "Live Component" type (155) in FIG. 2.
- The size of the browser window (width and height) containing the specific web page
- The size of the box drawn by the user (width and height)
- The offset of the box from the left and top border of the containing web page in eh browser window
- The user entered data such as the subject, tags, dashboard pages it will show up etc
- The URL of the original page
- Any visibility and access control information the user specified The system will save all those metadata to database as in the server machine 1161, FIG. 1b. That information can be re-used to construct a live component on-demand and get the latest information from the original web site as illustrated in FIG. 1c.

If the user clicks the "Post as Image" button (309) instead, a snapshot image will be created instead of a live component. This is helpful in some cases such as a confirmation page of online purchase.

There are many web pages that are HTML Form-based, requiring users to select or enter various parameters, then click on a submit button. A significant number of Form-based web page use HTTP POST to send the request. The URL of resulting page based on POST does not contain all the parameters in it, so a bookmark of that URL is not enough to re-generate the same page. This invention can convert the HTTP POST into HTTP GET method in those cases. With the help of a browser add-on or a browser bookmarklet, when a user is using a form-based web-page, and has selected all the parameters, he can activate the browser add-on or bookmarklet, If user clicks on the submit button now, all the parameter will be appended into the URL of the resulting web page corresponding to a HTTP GET method by the browser add-on or bookmarklet. Since this URL is repeatable for the corresponding user action, the live component created in this case using visual bookmarking in FIG. 3b will now work for the HTTP POST-based web pages.

FIG. 3c illustrates the user interface of creating a live column component on-demand through "component-level visual bookmarking" on a Web page by drawing a box around the region of interest (402), then select the option of "Post Column" (401) with the support of a browser add-on. The system's processing is almost the same as FIG. 3b, but selects a vertical region instead of a smaller rectangular area. The vertical region's top border is the same as the top border of the box drawn with the mouse; the bottom border will be all the way to the bottom of the web page being viewed. This is very useful for areas such as a long article or a table with many rows, in this cases, it is not very practical to draw a very long box with a mouse.

FIG. 3d illustrates the preview of the column region (502) on the screen before clicking the "post Column" button (501). This is the same screen as FIG. 3c, except with the user's mouse over "Post Column" button (501), the system will create the preview effect by hiding other area not selected. The system will automatically modify the DOM object of the web page in the browser; create several DIV areas on top of the regions that were not selected by the user with dark non-transparent color. This effectively hides all surrounding region and creates the preview effect of only showing the selected region.

FIG. 3e illustrates the user interface of clipping and creating a widget component on-demand through visual bookmarking on a Web page containing/embedding a widget component, with the support of a browser add-on. (Also see FIG. 2, 156). The user can activate the browser add-on first, the system will display two buttons in the page, the user can click on the "Image/Video/ . . . " button (302), then move the mouse over the widget of interest (602), the system will display a red-color border around the widget with a "Post" button (603) showing up automatically on the upper right corner of the bordered area. The user can click on it, the system will then display a popup dialog. The user can enter a title (605), keywords-based tags (606), dashboard page name where this widget component will show up (607), then click on the "Post" button (604) to submit the request. From the point, the system's processing is basically the same as described for FIG. 3a. The system will create a new widget component in the database as the "widget" (156) component type in FIG. 2.

The invention also allows users to create and add various types of components into dashboard pages in a centralized simple Web user interface without the need of any browser add-on. This is represented by the pop up screen after a user clicks on the "Add to this Page" link of FIG. 2 (161). So a user can start to add any component right there only with just a Web browser without the need to installing any additional software components on his machine.

FIG. 4a illustrates the schematic user interface of adding a rich text component to a specified dashboard page. Please see FIG. 2 161 for reaching this popup screen, also see FIG. 2, 151 and 152 for the resulting components from this process. Specifically, if a user clicks on the "Rich Text" tab (720) tab, the system will display the user interface of adding a rich-text-component to the dashboard on-the-fly. The user can enter a title (703), then author the rich text content (704) visually; then add any HTML elements such as text, bullet points, table, images; and can copy and paste from other Web pages or documents. The user can enter tags (705), dashboard page name (706), and select visibility (707). He can optionally share it to the working group he belongs to (708). If he clicks on the "Preview" button (709), the system will show a popup window with the preview of the content. If the user clicks the "Post Note" button, the system will send a request to backend server (1161 of FIG. 1b) along with all the data the user entered, to add the rich text component to the dashboard.

FIG. 4b1 illustrates the user interface of how to upload and add a document to the dashboard on-the-fly with the "Upload Doc" tab selected. (Also see FIG. 2, 154). The user can click on the "Browse" button (742), the system will open a window contains the open the file chooser dialog, which the user can choose documents from his computer with any Microsoft Office document or PDF document. He can then enter the rest of the fields similar to FIG. 4a. He can then click on the "Upload file now" button (745). The system will upload the file to the server, and convert it into Flash format (FIG. 4b2). A new document component will show up in the specified dashboard as a "Document" component type (154) of FIG. 2.

FIG. 4b2 is a flow chart illustrating a number of steps of how the system process the request after the user clicks on "Upload file now" button (754) in FIG. 4b1. The system will convert the uploaded document (1740) into Adobe Flash file (1743) on the server side (1742) by a backend conversion program (1471). The new Flash component representing the document can be delivered to a Web browser (1744) on-demand as an embedded object (1745) of a dashboard web page, which is a document component type (154) of a dashboard page (151) of FIG. 2.

FIG. 4c illustrates the user interface of how to adding a video into the dashboard page by copying and paste the video's embedded code (752). (Also see FIG. 2, 153). If the user clicks on the "Preview" button (753), the system will show a popup window (754), allowing the user to preview the video. If the user then clicks on the "Post Video" button (755), the system will send a request to backend server (1161 of FIG. 1b), and save the video component metadata to the database. When the component is requested as part of the dashboard it belongs to, the system will load it from database, and display it as an instance of the "video" component type (153) on FIG. 2.

FIG. 4d illustrates the user interface of how to adding a widget into the dashboard page by copying and paste the widget's embedded code (762). (Also see FIG. 2, 156). If the user clicks on the "Preview" button (763), the system will show a popup window (764). The user can click on the "Post Widget" button (765), the system will save the data to database as in 1161 of FIG. 1b, and associate the widget component to a named dashboard. When the component is requested as part of the dashboard it belongs to, the system will load it from database, and display it as an instance of the "widget" component type (156) on FIG. 2.

FIG. 4e illustrates the user interface of how to create a live area component on-demand from a web page, without the need of installing any Web browser add-on. (Also see FIG. 2, 155). The user can simply by copy and paste the URL of the web page (771) of interest into a URL text box (771), then click on the "Start" button (772), the system will display the web page at the region below (773), overlaying it with a semi-transparent canvas layer The user can draw a box (774) on the region of interest. The system will show a popup dialog (773). The user can click on either "Post Box" (776) or "Post Column" (777). The system will save all the metadata of the component to the database on the server machine as in 1161 of FIG. 1b. When the component is requested as part of the dashboard it belongs to, the system will load it from database, and display it as an instance of the "Live Component" type (155) on FIG. 2.

The functionality is about the same in the FIGS. 3a-3d and 4d with a slight difference in user operations. The difference here is that with the approach in FIG. 4d, no browser add-on is needed, but the user does need to do the extra step of copying and pasting the URL of the web page of interest into a Web URL text box first (771). It is a little less convenient during the operation time with the benefit of not requiring installing any add-on on the web browser. In both cases, the metadata of the component being created are sent by the browser to the server and saved to database as in FIG. 1b.

FIG. 4f illustrates the user interface of how to select from a library or catalog of components pre-populated by administration users, preview any of them, and then add to the dashboard page easily. An admin users or power user can pre-create many useful and re-usable components and organize them in multiple component catalogs or libraries. The admin user can define roles of users in the system, and assign different component catalogs to different user roles. When a user click on the "Add existing component" tab (780), the system will check the roles of the user, display the entitled component-catalogs corresponding to the user role. The catalogs can manifest as folder trees (781) similar to Window's Explorer. The user can expand the folder, and then click on any specific component (782) in the tree, the system will display a preview of the component on the screen. If the user decides to add the component from the catalog to a dashboard, he can click on "Add" icon (784); the system will display a confirmation message confirming that a copy of that component has been added to the user's dashboard. If the user refreshes that dashboard page, the new component will show up in the dashboard, ready to be manipulated. The actual components in a component catalog can be any one of the component types as illustrated in FIG. 2.

The invention has been described as being implemented by certain computer hardware, such as a client machine 1160, 1202 having a web browser 1102, and a server machine 1161, 1260 having a web server 1105, 1251, server application components 1107, 1252, and database 1109, 1253. It will be appreciated that the client machine 1160, 1202 and server machine 1161 can include other hardware elements. For instance, the client machine 1160, 1202 and server machine 1161 are operated by a processor or microprocessor which performs the various functions and operations in accordance with the invention. The machines can also have memory or other storage devices, and input devices, such as a mouse and keyboard. In addition, other suitable computer platforms can be used for the machines, such as a personal computer or mainframe computer. It will be further recognized that all or parts of the system and processes can be performed by executable computer instructions which are stored on and read from computer-readable media, such as hard disks, CD-ROM, read-only memory (ROM) or random-access memory (RAM). The processes of the invention can include other modules, programs, applications, scripts, processes, threads or code sections that interrelate with each other, and can be on a standalone computer, or a network.

Although the examples above show some specific user interface elements and layout, they are for illustration purpose, and can have various different actual implementations. Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for creating a situational dashboard web pages, the method comprising:
creating a plurality of web-page embeddable components from multiple disparate information sources, using a standard web browser, without the need of a desktop application and not tiered to a specific web browser, by selecting a region of a web page of interest by dragging-and-dropping a re-sizable selection box over an auto generated semitransparent layer overlaid on top of any existing web page, without the need to use any other desktop application or any web browser add-on or plug-in;
saving meta-data to a centralized network-based server database via a web server associated server-side application logic;
aggregating, using a computer-based web server and retrieving the meta-data stored in the centralized server database, the plurality of components into Web-based dashboard pages each with a unique URL, wherein the meta data is for the dashboard web pages as well as the web-page embeddable components; and
enabling a user to view and interact with multiple information components from said multiple disparate information sources, using the web browser, and to access the dashboard web pages via the unique URL.

2. The method according to claim 1, wherein said dashboard web page comprises multiple web-embeddable components that can be rendered using the standard web browser.

3. The method according to claim 1, wherein said selecting a region comprises using a pointing device to visually identify the region of a web page in the web browser, and then saving metadata related to the selected region from the web browser to a network-based database with the help of server-side application component running along with a Web server.

4. The method according to claim 1, wherein said step of creating comprises:
converting a web page using HTTP Form-POST into HTTP GET-based, with the resulting page's URL containing all parameters that were originally hidden as form variables in the HTTP POST request, bookmarking the updated URL containing the parameters, and retrieving the updated URL to dynamically update the dashboard web page.

5. The method according to claim 1, wherein a location, layout, size and look and feel of the components on said dashboard web page is configurable directly on the web user interface using any web browser, and said dashboard web page and said components can be shared with other users with various permissions for effective collaboration.

6. The method according to claim 1, further comprising organizing all the components of multiple users into shared component catalogs, saving the shared component catalogs on the network-accessible databases, and empowering multiple users to pick and access the shared component catalogs from their web browser, wherein the user can create at least one re-usable shared component catalog on the server-based database, and wherein the user can pick and choose from the at least one shared component catalog using the data on the shared network accessible database.

7. The method according to claim 1, further comprising auto-refreshing the dashboard page as a whole to get the latest information of all components on the overall dashboard web page.

8. The method according to claim 1, wherein the auto-refresh obtains current information from secured web pages requiring initial logging in, without the need to store the user's authentication by in another software while still preventing easy session timeout and forced manual re-login again and again.

9. The method according to claim 1, wherein a plurality of dashboard web pages are displayed on a display device in a slideshow mode, each dashboard web page with own displaying duration, wherein the slideshow mode ensures that a number of dashboard web pages are automatically displayed on the display device with multiple live or static components, with little direct user involvement to monitor large number of web pages.

10. The method of claim 1, further comprising a plurality of single dashboard web pages, wherein each of the plurality of single dashboard web pages is capable of containing information from each of the disparate information sources.

11. The method of claim 10, wherein two or more of the plurality of single dashboard web pages can be bundled together into a new web page with a single URL.

12. The method of claim 1, wherein the computer is further configured to save meta-data for the dashboard web page to a centralized server, and wherein the dashboard web page is associated with a unique URL that can be shared with other users via a global network.

13. A computer-implemented method for creating a situational dashboard web pages, the method comprising:
creating a plurality of web-page embeddable components from multiple disparate information sources, using a standard web browser, without the need of a desktop application and not tiered to a specific web browser, wherein said creating comprises:
clipping or bookmarking objects on one of the plurality of web pages using any Web browser by cursor-over selecting any web page embedded media object in said one of the plurality of web pages, wherein the embedded media object is an image, video or widget or any other embedded web object;
auto-detecting and highlighting the embedded media object the cursor is laying over; and
enabling the user to click a post button to bookmark the embedded object as a bookmark component;
saving meta-data to a centralized network-based server database via a web server associated server-side application logic;
aggregating, using a computer-based web server and retrieving the meta-data stored in the centralized server database, the plurality of components into Web-based dashboard pages each with a unique URL, wherein the meta data is for the dashboard web pages as well as the web-page embeddable components; and
enabling a user to view and interact with multiple information components from said multiple disparate information sources, using the web browser, and to access the dashboard web pages via the unique URL.

14. A system for assembling and rendering Web-based situational dashboard Web pages on-demand from multiple information sources, the system comprising:
a server having a network-based web server process, a set of server application components, and a network-based shared database; and a computer with any web browser configured with web browser add-on or web browser bookmarklet, wherein the web browser add-on or browser bookmarklet contains web browser client-side logic for analyzing a structure of a web page in a web browser, and submitting metadata to the network-based web server and database through HTTP or HTTPS protocol, said computer creating a plurality of web-page embeddable components from multiple disparate information sources including enabling a user to select a region of a web page of interest by dragging-and-dropping a re-sizable selection box over an auto generated semitransparent layer overlaid on top of any existing web page, without the need to use any other desktop application or any web browser add-on or plug-in.

15. The system according to claim 14, wherein a key server application component is used to dynamically assemble a dashboard web page from a requested URL pointing to that dashboard web page, by finding out a list of components in the dashboard web page, information sources for list of components, and a layout of the dashboard web page from metadata stored in the network-based database and render them dynamically in any web browser the user is using.

16. The system according to claim 14, wherein the server application components can generate dashboard web pages containing componentized live area information from multiple secured web sites requiring user-login, on screen, without requiring a user to share and store the login credentials to the dashboard application as long as the user first signs into each web site from the same web browser, then the system can automatically refresh the dashboard web pages containing the live components, wherein the information from each of the secure sources will be displayed fine on the same dashboard web page.

17. A system for assembling and rendering Web-based situational dashboard Web pages on-demand from multiple information sources, the system comprising:

a server having a network-based web server process, a set of server application components, and a network-based shared database; and a computer with any web browser configured with web browser add-on or web browser bookmarklet or a client-side logic in a containing web page, wherein the web browser add-on or browser bookmarklet contains web browser client-side logic for analyzing a structure of a web page in a web browser, and submitting metadata to the network-based web server and database through HTTP or HTTPS protocol, said computer creating a plurality of web-page embeddable components from multiple disparate information sources and enabling a user to clip or bookmark objects on one of a plurality of web pages using any Web browser by cursor-over selecting any web page embedded media object in said one of the plurality of web pages, wherein the embedded media object is an image, video or widget or any other embedded web object.

* * * * *